(12) United States Patent
Choi

(10) Patent No.: US 9,796,257 B2
(45) Date of Patent: Oct. 24, 2017

(54) POWERTRAIN FOR HYBRID VEHICLE

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 230 days.

(21) Appl. No.: 14/695,378

(22) Filed: Apr. 24, 2015

(65) Prior Publication Data

US 2016/0144701 A1    May 26, 2016

(30) Foreign Application Priority Data

Nov. 21, 2014  (KR) .................. 10-2014-0163709

(51) Int. Cl.

| F16H 3/08 | (2006.01) |
|---|---|
| B60K 6/36 | (2007.10) |
| B60W 20/00 | (2016.01) |
| B60W 10/26 | (2006.01) |
| F16H 3/089 | (2006.01) |
| B60K 6/48 | (2007.10) |
| B60K 6/547 | (2007.10) |

(52) U.S. Cl.

CPC .................. *B60K 6/36* (2013.01); *B60K 6/48* (2013.01); *B60K 6/547* (2013.01); *B60W 10/26* (2013.01); *B60W 20/00* (2013.01); *F16H 3/089* (2013.01); *B60K 2006/4816* (2013.01); *F16H 2003/0818* (2013.01); *F16H 2003/0822* (2013.01); *F16H 2200/2046* (2013.01); *Y02T 10/6221* (2013.01); *Y02T 10/6256* (2013.01); *Y10S 903/919* (2013.01)

(58) Field of Classification Search

CPC .. F16H 3/006; F16H 2003/0931; F16H 3/091; F16H 47/02

USPC ................................ 74/330, 331, 333, 340
See application file for complete search history.

(56) References Cited

U.S. PATENT DOCUMENTS

| 8,522,635 B2* | 9/2013 | Pastorello | B60K 6/48 74/330 |
|---|---|---|---|
| 8,960,033 B2* | 2/2015 | Kaltenbach | B60K 6/48 74/331 |
| 8,979,693 B2* | 3/2015 | Hellenbroich | B60K 6/40 475/5 |
| 2013/0345018 A1* | 12/2013 | Kaltenbach | B60K 6/48 477/5 |

FOREIGN PATENT DOCUMENTS

| JP | 2012-245877 A | 12/2012 |
|---|---|---|
| JP | 2012-247018 A | 12/2012 |
| JP | 2013-141938 A | 7/2013 |
| KR | 10-2009-0020176 A | 2/2009 |
| KR | 10-2013-0060943 A | 6/2013 |
| KR | 10-2013-0104387 A | 9/2013 |
| KR | 10-2013-0115618 A | 10/2013 |

\* cited by examiner

*Primary Examiner* — Ha D Ho

(74) *Attorney, Agent, or Firm* — Morgan, Lewis & Bockius LLP

(57) ABSTRACT

A powertrain may include a plurality of shafts disposed in parallel with a transmission input shaft of a first shifting mechanism which receives power from an engine, and transmitting power from a motor to a driving shaft while a vehicle is driven; and a second shifting mechanism including a plurality of gears fitted on the shafts, in which one of the gears remains engaged and rotated as a driven gear by a constant synchronizer while the vehicle is driven.

8 Claims, 4 Drawing Sheets

POWERTRAIN FOR HYBRID VEHICLE

CROSS REFERENCE TO RELATED APPLICATION

The present application claims priority of Korean Patent Application Number 10-2014-0163709 filed on Nov. 21, 2014, the entire contents of which application are incorporated herein for all purposes by this reference.

BACKGROUND OF THE INVENTION

Field of the Invention

The present invention generally relates to a powertrain for a hybrid vehicle. More particularly, the invention relates to a powertrain for a hybrid vehicle that can improve shifting ability with high efficiency by connecting a motor to a driving shaft for front wheels and provide a gear ratio for an additional high speed.

Description of Related Art

An automated manual transmission can provide convenience for a driver, similar to an automatic transmission, by providing an automatic shifting by means of an actuator while a vehicle is driven and can contribute to improving fuel efficiency of a vehicle while maintaining power transmission efficiency higher than an automatic transmission.

However, for an automated manual transmission based on a synchro-mesh type shifting mechanism, there is necessary a period where power from an engine is disconnected while automatic shifting is performed by an actuator that shifts gears, so torque is decreased and the shifting ability is deteriorated such as backward pulling of a vehicle.

Therefore, there is a need for a powertrain for a hybrid vehicle that can provide shifting without shock, even if power from an engine is disconnected during shifting while a vehicle is driven.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a powertrain for a hybrid vehicle that can provide shifting without shock, even if power from an engine is disconnected during shifting while a vehicle is driven.

In an aspect of the present invention, a powertrain for a vehicle, may include a first shifting mechanism including the transmission input shaft, a plurality of shafts disposed in parallel with the transmission input shaft of the first shifting mechanism that receives power from an engine, and transmitting power from a motor to a driving shaft while the vehicle is driven, and a second shifting mechanism including a plurality of gears fitted on the plurality of shafts, one of the plurality of gears remaining engaged and rotated as a driven gear by a constant synchronizer while the vehicle is driven.

A shifting rail selecting shift ranges is provided for the first shifting mechanism and the second shifting mechanism to selectively engage the plurality of gears, wherein the shifting rail may have a motor shift range, and wherein while the vehicle is driven, gears corresponding to speeds of the vehicle are selected and the constant synchronizer remains engaged with the driven gear.

A shifting rail selecting shift ranges is provided for the first shifting mechanism and the second shifting mechanism to selectively engage the plurality of gears, and when a neutral gear is engaged, the constant synchronizer remains engaged with the driven gear.

A shifting rail selecting shift ranges is provided for the first shifting mechanism and the second shifting mechanism to selectively engage the plurality of gears, and when a motor shift range is selected, the constant synchronizer is disengaged from the driven gear.

The second shifting mechanism may include a first shaft and a second shaft, a driving gear is fitted on the first shaft, a driven gear and an output gear are fitted on the second shaft, and the driven gear is engaged with or disengaged from the constant synchronizer so that power from the motor is transmitted to or disconnected from the driving shaft.

The motor is directly connected to the first shaft.

A reverse gear and a reverse synchronizer engaged with or disengaged from the reverse gear are fitted on the first shaft.

The reverse gear is engaged with a driving gear on the transmission input shaft of the first shifting mechanism.

When the vehicle idles, the second shifting mechanism disengages the driven gear and the constant synchronizer from each other and engages the reverse gear and the reverse synchronizer with each other so that a driving force from the engine is input to the motor and charges a battery.

According to the powertrain for a hybrid vehicle of the present invention, it is possible to directly connect a motor to a driving shaft even without adding parts to a shifter/selector in the existing AMTs or DCIs. Further, idle charging is possible by disengaging a motor when a vehicle idles, so an HSG can be removed. Further, since the motor remains directly connected to the driving shaft when a vehicle is driven, the disconnected power from the engine is compensated by the motor even during shifting, so the shifting ability is improved without shock.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
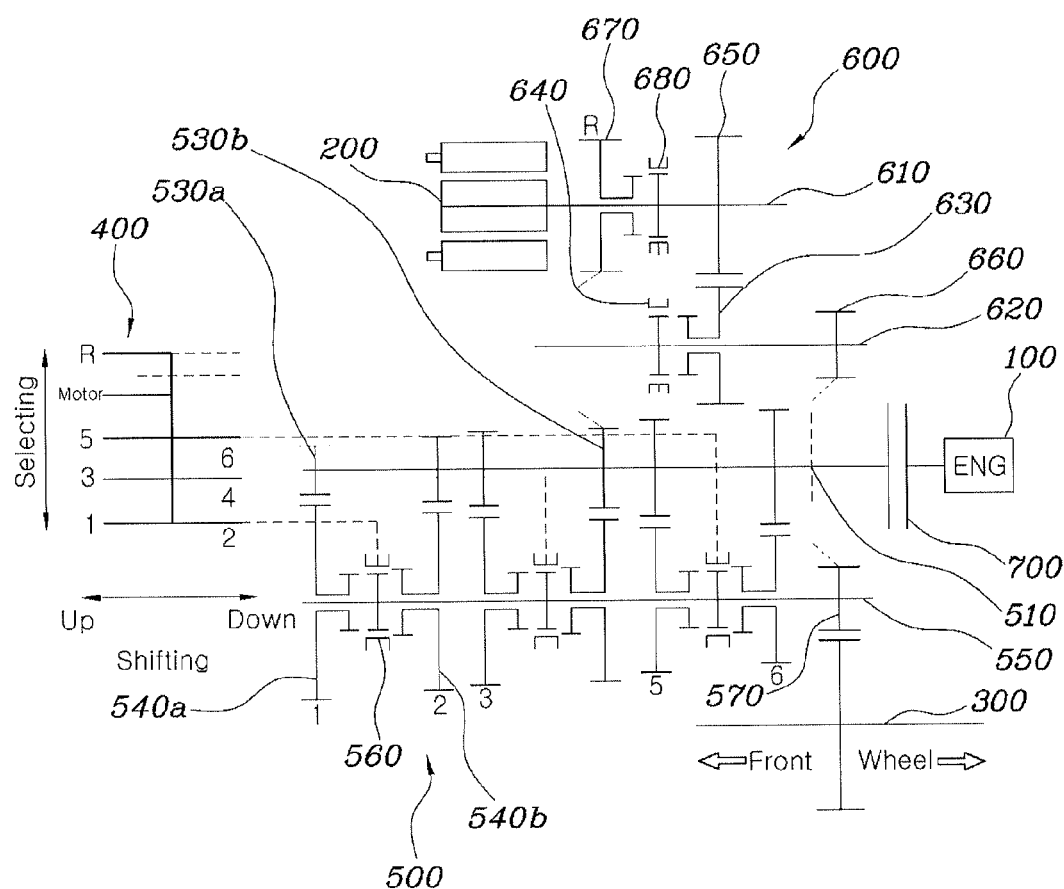
FIG. 1 is a diagram showing the construction of a powertrain of a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a powertrain for a hybrid vehicle according to an embodiment of the present invention will be described with reference to the accompanying drawings.

Figure 2:
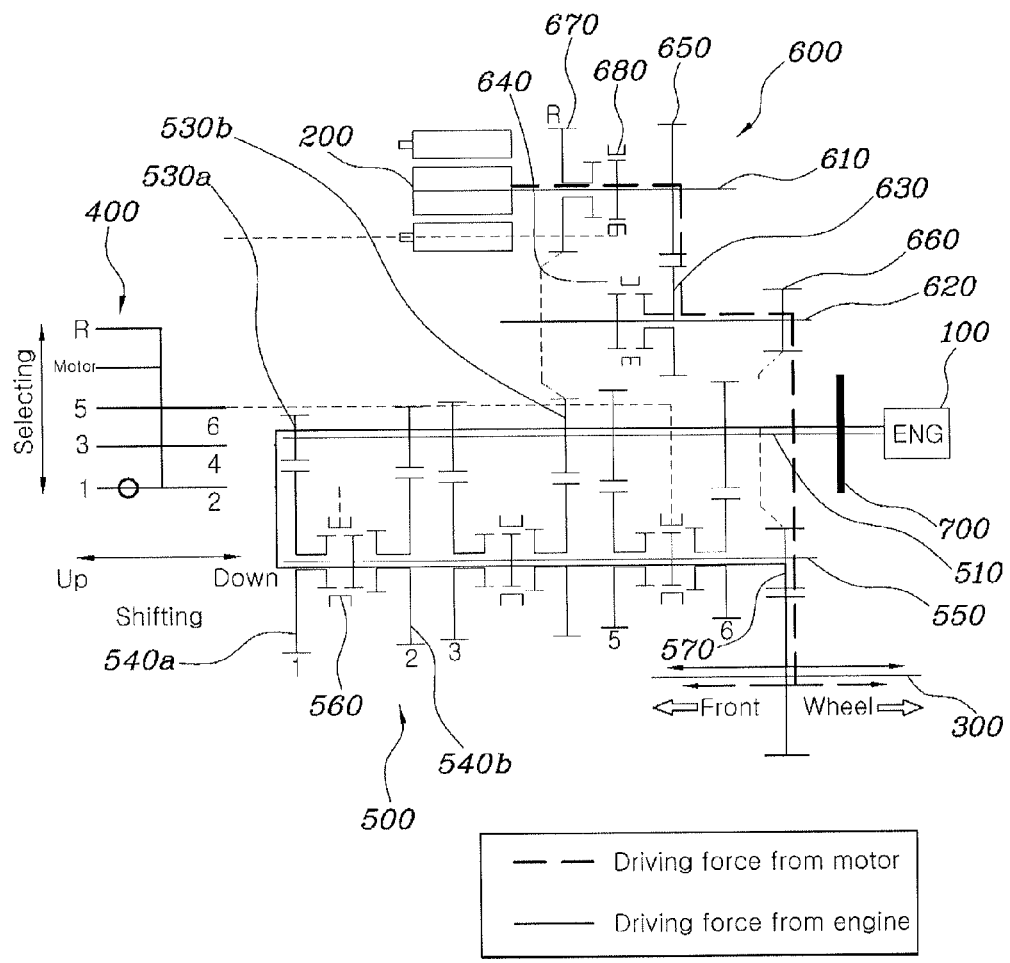
FIG. 2 is a diagram showing a power flow in operation of the powertrain shown in FIG. 1.
Figure 3:
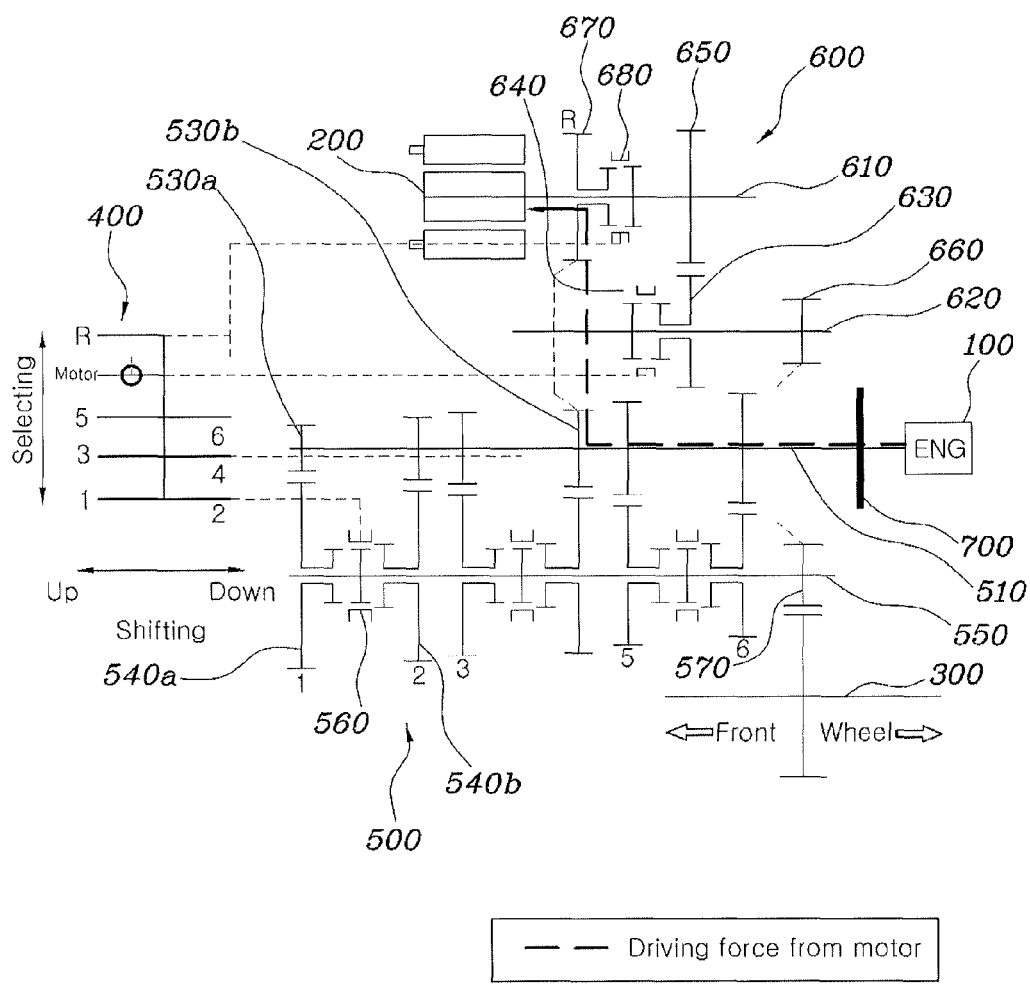
FIG. 3 is a diagram showing idle charging of the motor shown in FIG. 1.
Figure 4:
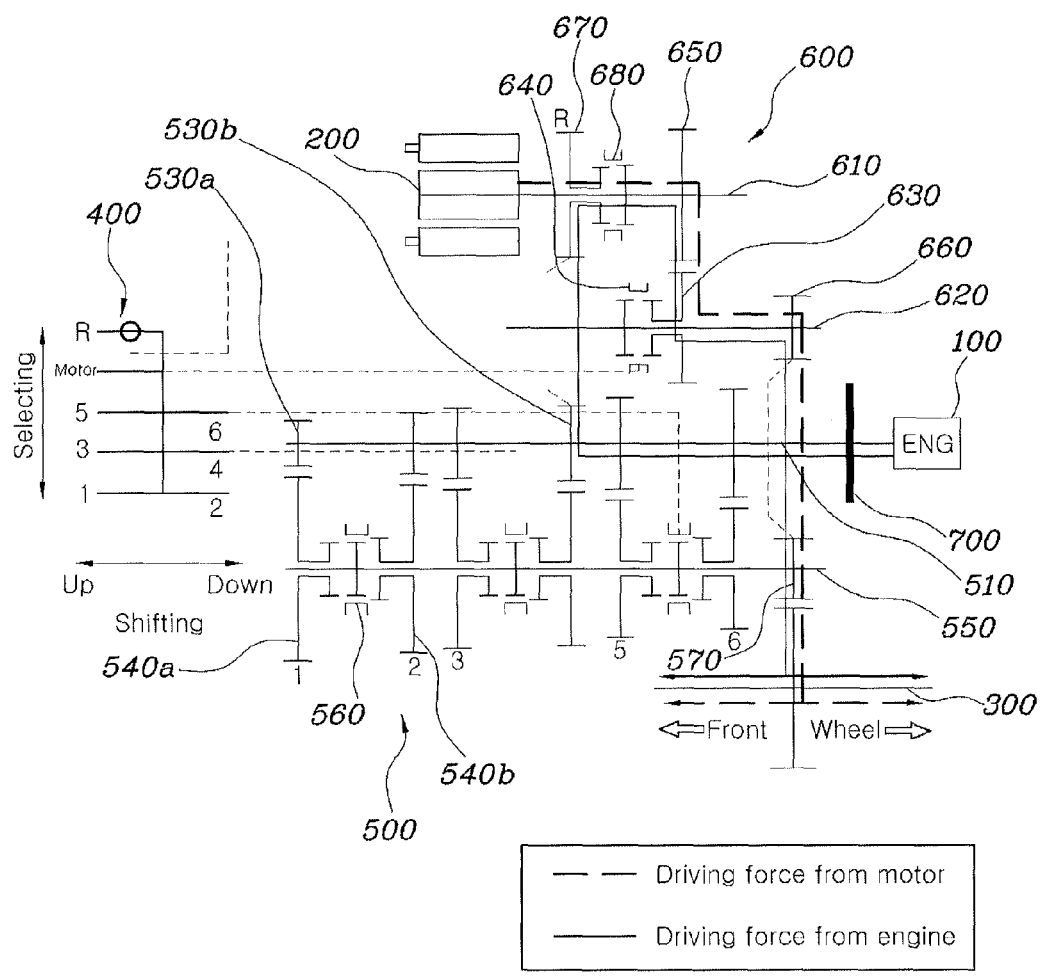
FIG. 4 is a view showing the powertrain shown in FIG. 1 when it operates for backward movement.

FIG. 1 is a diagram showing the construction of a powertrain of a hybrid vehicle according to an exemplary embodiment of the present invention, FIG. 2 is a diagram showing a power flow in operation of the powertrain shown in FIG. 1, FIG. 3 is a diagram showing idle charging of the motor shown in FIG. 1. FIG. 4 is a view showing the powertrain shown in FIG. 1 when it operates for backward movement.

A powertrain for a hybrid vehicle according to an exemplary embodiment of the present invention includes: a plurality of shafts 610 and 620 disposed in parallel with a transmission input shaft 510 of a first shifting mechanism 500 which receives power from an engine 100, and transmitting power from a motor 200 to a driving shaft 300 while a vehicle is driven, and a second shifting mechanism 600 including a plurality of gears 630,650,660, and 670 fitted on the shafts 610 and 620, in which one of the gears remains engaged and rotated as a driven gear 630 by a constant synchronizer 640 while the vehicle is driven.

The present invention relates to a powertrain for a hybrid vehicle, in which both the motor 200 and the engine 100 are mounted and the shifting mechanism 500 and 600 are provided for the motor 200 and the engine 100, respectively. The first shifting mechanism 500 connected to the engine 100 includes a transmission input shaft 510, a plurality of driving gears 530a and 530b on the transmission input shaft 510, a transmission output shaft 550, a driven gear 540 rotating relative to the transmission output shaft 550, and a plurality of synchronizers 560 selectively synchronizing the driven gear 540 for each gear to shift into. It should be understood that the configuration and arrangement of the first shifting mechanism 500 stated herein may be modified in various ways by those skilled in the art, if necessary.

The second shifting mechanism 600 is provided for the motor 200, so power from the motor 200 is transmitted to the driving shaft 300 and combined with the driving force from the engine 100 when a vehicle is driven. Even if the power from the engine 100 is disconnected by a clutch 700 for shifting, the power from the motor 200 continues to be transmitted to the driving shaft 300, so power is not disconnected during shifting in the entire system, and accordingly, a shifting ability is improved without shock.

Describing in detail the configuration of the present invention, the second shifting mechanism 600 includes the first shaft 610 and the second shaft 620, the driving gear 650 is fitted on the first shaft 610, and the driven gear 630 and the output gear 660 are fitted on the second shaft 620. The first shaft 610 is directly coupled to the driving gear 650 and the motor 200, so it is rotated along with them by the power from the motor 200. The output gear 660 is directly coupled to the second shaft 660 and rotated with it, and the driven gear 630 is rotated on and relative to the second shaft 620. Therefore, the driven gear 630 is engaged with or disengaged from the constant synchronizer 640, so it can transmit or disconnect the power, which is provided from the motor 200, to or from the driving shaft 300.

A reverse gear 670 and a reverse synchronizer 680 engaged with or disengaged from the reverse gear 670 are fitted on the first shaft 610. The reverse gear 670 is engaged with one of the driving gears 530b on the transmission input shaft 510 of the first shifting mechanism 500. Accordingly, when the reverse gear 670 is engaged by the reverse synchronizer 680, the power from the engine 100 is transmitted to the driving shaft 300 through the driving gear 530 of the first shifting mechanism 500, so the vehicle can be driven backward. Obviously, the power from the motor 200 is also transmitted to the driving shaft 300 by the reverse gear 670 and the reverse synchronizer 680. In the exemplary embodiment, the reverse gear 670, the reverse synchronizer 680, and the driving gear 650 are sequentially disposed on the first shaft 610, but this arrangement may be freely changed in accordance with the design or the environment.

The driven gear 630 is disposed on the second shaft 620 and rotated relative to the second shaft 620. The driven gear 630 is driven by the driving gear 650 on the first shaft 650, but it is rotated relative to the second shaft 620, so it is rotated with the second shaft 620 by being engaged by the constant synchronizer 640. Further, the output gear 660 is fitted on the second shaft 620, so the power from the motor 200 is finally transmitted to the driving shaft 300 through the driving gear 650, the driven gear 630, and the output gear 660.

Since the motor 200 is directly connected to the first shaft, the power from the motor 200 is transmitted to the driving shaft 300 through the driving gear 650 on the first shaft 610 and the driven gear 630 on the second shaft 620, when the vehicle idles, the power from the engine 100 is transmitted to the motor 200 and a battery is charged.

A shifting rail 400 that can select shift ranges is provided for the first shifting mechanism 500 and the second shifting mechanism 600 to selectively engage the gears. The shifting rail 400 has a motor shift range, and while a vehicle is driven, the gears corresponding to the speeds of the vehicle are selected and the constant synchronizer 640 remains engaged with the driven gear 630.

The shifting rail 400 is configured such that even though a neutral gear is engaged, the constant synchronizer 640 remains engaged with the driven gear 630, so the power from the motor 200 is continuously transmitted to the driving shaft 300 even during shifting. Accordingly, even if the power from the engine 100 is disconnected by the clutch 700 during shifting, the driving force from the motor 200 is transmitted to the driving shaft 300, so shock is not generated, and thus smooth shifting is made possible and the shifting ability is increased.

Finally, the shifting rail 400 has a motor shift range, and when a driver moves the shift lever to the motor shift range, the constant synchronizer 640 is disengaged from the driven gear 630 and the power from the motor 200 is not transmitted to the driving shaft 300. Accordingly, when a vehicle idles, it is possible to charge a battery by reversing the motor 200 with the power from the engine, using the reverse gear 670 and the reverse synchronizer 680.

The power flows when a vehicle is driven, idles, and moved backward are described with reference to FIGS. 2 to 4.

FIG. 2 is a diagram showing a power flow in the powertrain while a vehicle is driven with a first gear engaged. First, as for the first shifting mechanism 500 for the engine 100, a first driven gear 540a and a second driven gear 540b are fitted on the transmission output shaft 550. The synchronizer 560 between the first driven gear 540a and the second driven gear 540b is engaged with the first driven gear 540a, so the power from the engine 100 is transmitted to the first driven gear 540a on the transmission output shaft 550 through a first driving gear 530a on the transmission input shaft 510. Therefore, the power from the engine 100 is transmitted from the transmission input shaft 510 to the driving shaft 300 through the output gear 570 on the transmission output shaft 550.

As for the second shifting mechanism 600 for the motor 200, the driven gear 630 on the second shaft 620 is engaged by the constant synchronizer 640, so the power from the motor 200 is transmitted to the driven gear 630 through the driving gear 650 on the first shaft 60, and the second shaft 620 is rotated by the driven gear 630, so the power from the motor 200 is transmitted to the driving shaft 300 through the output gear 660 on the second shaft 620 and combined with the power from the engine 100. Accordingly, since the power from the motor 200 is continuously transmitted to the driving shaft 300 even during shifting, even if the power from the engine 100 is disconnected by the clutch 700 during shifting, a driving force is continuously transmitted to the driving shaft 300, such that shifting ability is increased without shock.

FIG. 3 is a diagram showing idle charging of the motor 200, in which the motor shift range of the shifting rail 400 has been selected. When a vehicle idles, the driving force from the engine does not need to rotate the driving shaft 300, so it reverses the motor 200, thereby charging a battery.

Accordingly, when the motor shift range is selected in the shifting rail 400 for the first shifting mechanism 500 and the second shifting mechanism 600, the constant synchronizer 640 and the driven gear 630 are disengaged. As the constant synchronizer 640 and the driven gear 630 are disengaged, even if the driving gear 650 on the first shaft 610 is rotated by the motor 200, the driven gear 630 on the second shaft 620 cannot rotate the second shaft 620, so power is not transmitted to the driving shaft 300. Therefore, it is possible to charge the battery by reversing the motor 200, using the power from the engine 100, when a vehicle idles, so there is no need for a part such as an HSG (Hybrid Starter Generator) and the manufacturing cost is reduced accordingly.

Describing the process of charging the battery using the motor 200, when a vehicle idles, the second shifting mechanism 600 disengages the driven gear 630 and the constant synchronizer 640 and engages the reverse gear 670 and the reverse synchronizer 680, such that the driving force from the engine 100 is input to the reverse gear 670 through the reverse driving gear 530b on the transmission input shaft 510. Since the reverse gear 670 is disengaged with the reverse synchronizer 680, the driving force is input to the motor 200 by rotating the first shaft 610 in the opposite direction to the direction when the vehicle is driven, thereby the battery is charged. However, since the driven gear 630 is disengaged from the constant synchronizer 640, even if the clutch 700 is not disengaged in idling, the battery can be charged by the driving force from the engine 100, by reversing the motor 200, and power is not transmitted to the driving shaft 300.

FIG. 4 is a diagram illustrating when a vehicle is moved backward, in which a reverse range in the shifting rail 400 has been selected. In the second shifting mechanism 600, the driven gear 630 on the second shaft 620 is engaged by the constant synchronizer 640. When a vehicle is moved backward, the power from the engine 100 is transmitted to the reverse gear 670 through the driving gear 530b that is in mesh with the reverse gear 670 through the transmission input shaft 510. The reverse gear 570 is engaged with the reverse synchronizer 680 and rotated with the first shaft 610 in the opposite direction to the direction when the vehicle is driven. The power input to the reverse gear 670 is transmitted to the output gear 660 through the driving gear 650 on the first shaft 610 and the driven gear 630 on the second shaft 620 and then transmitted to the driving shaft 300.

Similarly, when the reverse range is selected, the power from the motor 200 is transmitted to the driving shaft 300 in the same direction as the power transmitted to the reverse gear 670 from the engine 100. In this process, the driving shaft 300 is reversed by the reverse gear 670 and the vehicle is moved backward.

According to another embodiment of the present invention, AMTs of the related art need four lines of selectors in a selecting rail from the first range to the reverse range to achieve six gear ratios. However, in an exemplary embodiment of the present invention, there is a need for the motor shift range, so a line of selector is additionally required. Accordingly, parts are added, but in order to prevent addition of the parts, the reverse range may be connected to a gear lever by a wire (rod) such as a P-range without being connected to an electric shifter/selector to be operated by a driver. According to this configuration, the number of operations of the shifter/selector is the same as that of the existing AMTs, so there is no need of additional costs.

According to the powertrain for a hybrid vehicle of the present invention, it is possible to directly connect a motor to a driving shaft even without adding parts to a shifter/selector in the existing AMTs or DCIs. Further, idle charging is possible by disengaging a motor when a vehicle idles, so an HSG can be removed. Further, since the motor remains directly connected to the driving shaft when the vehicle is driven, the disconnected power from the engine is compensated by the motor even during shifting, so shifting ability is improved without shock.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A powertrain for a vehicle, comprising:
   a first shifting mechanism including the transmission input shaft;
   a plurality of shafts disposed in parallel with the transmission input shaft of the first shifting mechanism that receives power from an engine, and transmitting power from a motor to a driving shaft while the vehicle is driven; and
   a second shifting mechanism including a plurality of gears fitted on the plurality of shafts, one of the plurality of gears remaining engaged and rotated as a driven gear by a constant synchronizer while the vehicle is driven, wherein a shifting rail selecting shift ranges is provided for the first shifting mechanism and the second shifting mechanism to selectively engage the plurality of gears, wherein the shifting rail has a motor shift range, and wherein while the vehicle is driven, gears corresponding to speeds of the vehicle are selected and the constant synchronizer remains engaged with the driven gear.

2. The powertrain of claim 1, wherein the shifting rail selecting shift ranges is provided for the first shifting mechanism and the second shifting mechanism to selectively engage the plurality of gears, and when a neutral gear is engaged, the constant synchronizer remains engaged with the driven gear.

3. The powertrain of claim 1, wherein the shifting rail selecting shift ranges is provided for the first shifting mechanism and the second shifting mechanism to selectively engage the plurality of gears, and when a motor shift range is selected, the constant synchronizer is disengaged from the driven gear.

4. The powertrain of claim 1, wherein the second shifting mechanism includes a first shaft and a second shaft having the driven gear, a first driving gear is fitted on the first shaft, the driven gear and an output gear are fitted on the second shaft, and the driven gear of the second shaft is engaged with or disengaged from the constant synchronizer so that power from the motor is transmitted to or disconnected from the driving shaft.

5. The powertrain of claim 4, wherein the motor is directly connected to the first shaft.

6. The powertrain of claim 4, wherein a reverse gear and a reverse synchronizer engaged with or disengaged from the reverse gear are fitted on the first shaft.

7. The powertrain of claim 6, wherein the reverse gear is engaged with a second driving gear on the transmission input shaft of the first shifting mechanism.

8. The powertrain of claim 7, wherein when the vehicle idles, the second shifting mechanism disengages the driven gear of the second shaft and the constant synchronizer from each other and engages the reverse gear and the reverse synchronizer with each other so that a driving force from the engine is input to the motor and charges a battery.

* * * * *